United States Patent [19]

Logan

[11] 4,438,578
[45] Mar. 27, 1984

[54] PICTURE FRAME AND CORNER BRACKET ASSEMBLY

[75] Inventor: Malcolm Logan, Barrington, Ill.

[73] Assignee: Logan Graphic Products, Inc., Wauconda, Ill.

[21] Appl. No.: 487,316

[22] Filed: Apr. 21, 1983

[51] Int. Cl.³ .............................................. G09F 1/12
[52] U.S. Cl. ...................................... 40/152; 403/402
[58] Field of Search ...................... 40/152, 152.1, 155, 40/10 R; 403/402, 401

[56] References Cited

U.S. PATENT DOCUMENTS

| | | | |
|---|---|---|---|
| 111,128 | 1/1871 | Linscott | 403/401 |
| 2,081,722 | 5/1937 | Weinzierl . | |
| 2,290,430 | 7/1942 | Heiser . | |
| 2,581,843 | 1/1952 | Edwards . | |
| 2,633,653 | 4/1953 | Angus et al. | 40/155 |
| 2,654,451 | 10/1953 | Schmidgall . | |
| 2,805,506 | 9/1957 | Thompson . | |
| 2,844,233 | 7/1958 | Westman . | |
| 2,947,391 | 8/1960 | Wayne . | |
| 2,996,159 | 8/1961 | Casebolt . | |
| 3,200,913 | 8/1965 | Nelson . | |
| 3,275,356 | 9/1966 | Heywood . | |
| 3,317,227 | 5/1967 | Nijhuis . | |
| 3,336,689 | 8/1967 | Miller | 40/152 |
| 3,445,950 | 5/1969 | Gerik . | |
| 3,492,034 | 1/1970 | Skipp . | |
| 3,534,490 | 10/1970 | Herbert . | |
| 3,603,627 | 9/1971 | Kaffel . | |
| 3,668,799 | 6/1972 | Sharron . | |
| 3,698,114 | 10/1972 | Hirsch et al. . | |
| 3,899,844 | 8/1975 | Munn . | |
| 3,900,980 | 8/1975 | Chambers . | |
| 3,946,511 | 3/1976 | Weiner, Jr. . | |
| 3,965,601 | 6/1976 | Nielsen . | |
| 3,990,168 | 11/1976 | Murray | 40/152 |
| 4,122,617 | 10/1978 | Nielsen | 40/155 |
| 4,233,764 | 11/1980 | Small . | |
| 4,236,847 | 12/1980 | Yasuda | 403/402 |
| 4,236,847 | 12/1980 | Yasuda . | |
| 4,237,630 | 12/1980 | Franzone . | |
| 4,237,631 | 12/1980 | Moe et al. . | |
| 4,237,632 | 12/1980 | Segerstad . | |
| 4,240,765 | 12/1980 | Offterdinger . | |
| 4,332,495 | 6/1982 | Burgers . | |
| 4,336,884 | 6/1982 | Hart et al. . | |
| 4,348,126 | 9/1982 | Hays, Jr. . | |
| 4,348,826 | 9/1982 | Reim . | |
| 4,349,974 | 9/1982 | Rapayelian . | |
| 4,368,584 | 1/1983 | Logan . | |
| 4,377,915 | 3/1983 | Zossimas et al. . | |

FOREIGN PATENT DOCUMENTS

| | | | |
|---|---|---|---|
| 629532 | of 0000 | Belgium . | |
| 608459 | 11/1960 | Canada . | |
| 816971 | 7/1969 | Canada | 403/402 |
| 1907179 | of 0000 | Fed. Rep. of Germany . | |
| 2162381 | 6/1973 | Fed. Rep. of Germany . | |
| 2623752 | of 0000 | Fed. Rep. of Germany . | |
| 1460477 | of 0000 | France . | |
| 2376643 | of 0000 | France . | |
| 2392636 | of 0000 | France . | |
| 6908189 | of 0000 | Netherlands . | |
| 449916 | of 0000 | Switzerland . | |

OTHER PUBLICATIONS

2 Color Photographs marked AR-1 and AR-2, 2 Color Photographs marked AS-1 and AS-2.

Primary Examiner—Gene Mancene
Assistant Examiner—Wenceslao J. Contreras
Attorney, Agent, or Firm—Dressler, Goldsmith, Shore, Sutker & Milnamow, Ltd.

[57] ABSTRACT

Picture frame components include frame sections each having a channel and communicating cavity that are open at the rear of the frame. At least a region of each frame section adjacent the cavity is deformable and defines a deformable bearing surface. At each frame corner a bracket is provided to hold two adjoining frame sections together. The bracket has two legs with an engaging member on each leg that presents an engaging wall for being received in the frame section cavity and for engaging the deformable region of the frame section. Either the engaging wall or bearing surface, or both, are angled relative to the frame section length. The bracket is inserted in the channels of the adjoining frame sections and each frame section bearing surface is deformed by the engaging wall as the frame sections are forced tightly together.

6 Claims, 4 Drawing Figures

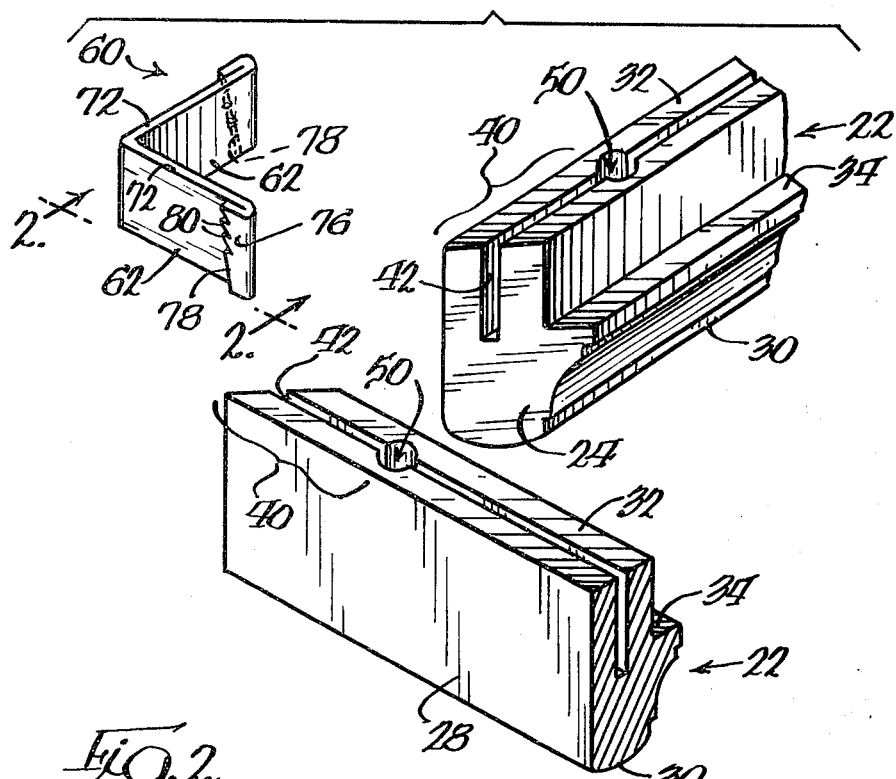
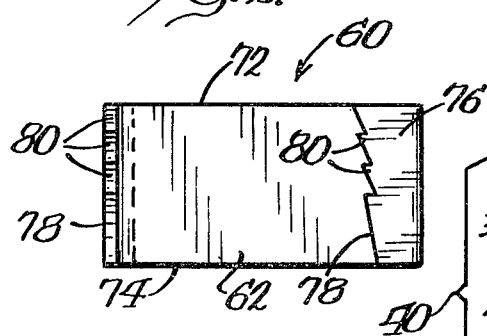
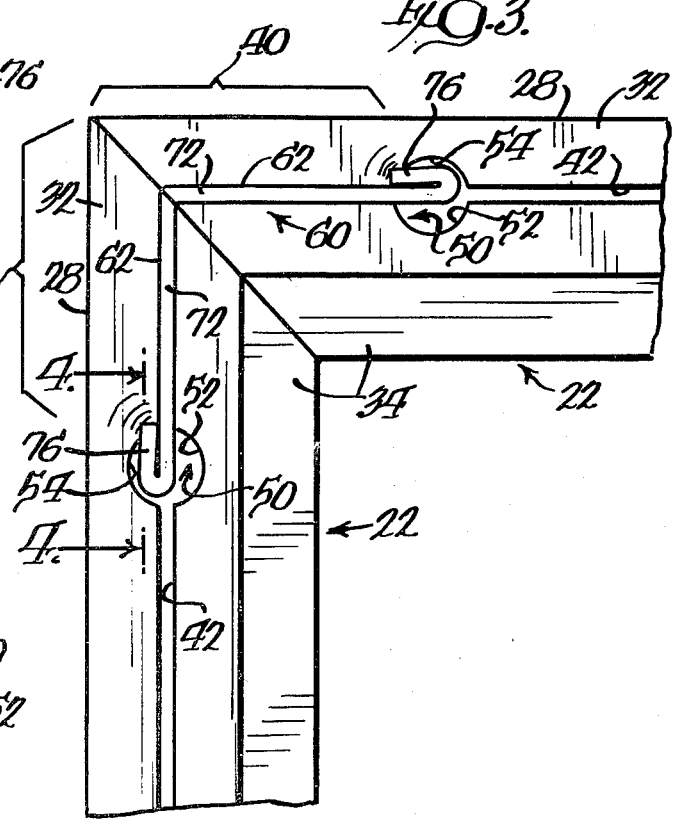
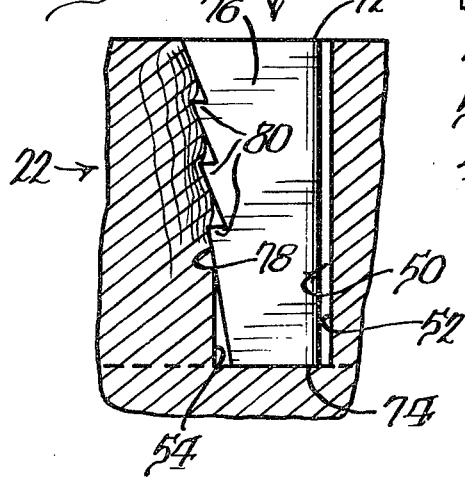

PICTURE FRAME AND CORNER BRACKET ASSEMBLY

DESCRIPTION

1. Technical Field

This invention relates to components for constructing a picture frame suitable for framing pictures, documents and the like that are to be displayed for viewing

2. Background of the Invention

A variety of picture frame structures are in use today or have been suggested for use. Some frame structures can be provided in the form of packaged components which may be assembled by the retail purchaser to form a complete frame. Other frame structures are typically fabricated and sold to the consumer as a completed, ready-made frame. In either case, it is desirable to provide a component design that facilitates the assembly of the frame and results in a strong, tight frame.

Picture frame structures commonly incorporate a plurality of moldings, channels, or frame sections which are shaped at their ends to form a miter joint corner. Further, the adjacent ends of the frame sections at the frame corner are typically secured together in some fashion through the use of an L-shaped bracket which is disposed at the corner of the frame so that each leg of the bracket extends along or in one of the adjacent frame sections.

Many picture frame structures are fabricated from rigid, non-deformable materials, such as steel, aluminum, and the like. Although such metal frames are widely used, frames made of wood molding also continue to be widely used, and indeed, preferred in many instances.

Also, some people prefer to make their own frames. Typically, only professional frame makers or professional assemblers of frames are able to work with metal frame sections. The non-professional generally works with wood frames wherein the wood frame sections are relatively easily cut to the desired configuration with tools and jigs that are readily available to the non-professional.

One common method for assembling wood frames involves the use of glue and/or nails. Typically, the frame sections are held together in a suitable jig to form at least one of the frame's corners. Glue may be initially applied before the ends of the framed sections are clamped together in contact (typically along a 45° miter). Nails of an appropriate size are then driven from the exterior side of at least one of the frame sections into the mitered end face of the adjoining frame section. The nail heads are typically set below the exterior surface of the frame section and filled over with putty or other suitable compound.

The above-described method is typically effected with a suitable clamping jig to ensure the proper formation of a tight joint. The step of using such a jig, along with the steps of gluing the frame section ends, driving the nails, setting the nail heads, and filling over the nail heads, together constitute a long process which can involve more equipment, materials, and skill than many people possess and/or wish to devote to the fabrication of a picture frame. In view of this, efforts have been made to provide a less costly and less complex method for assembling a picture frame.

One method involves the use of prefabricated frame sections which have bores drilled in each mitered end of the frame section. A special L-shaped, molded, thermoplastic member is provided to fit in the bores of adjoining frame sections to strengthen the joint.

In another approach, a metal, blade-like fastening member is provided for being driven into the frame sections at each corner of the frame. The blade-like member is slightly tapered from a wider knife edge on the bottom to a narrower upper portion. Tranverse flanges are provided along each tapering side. In use, two frame sections are first oriented to form a corner of the frame with the miter faces in surface-to-surface contact. While holding the two frame sections together in this orientation, the assembler disposes the knife edge of the blade-like member across the miter joint interface at an angle that is generally normal to the miter joint interface. The blade-like member is then driven, as by pounding it with a hammer, down into the two frame sections. As the blade-like member is driven into the frame sections, the converging flanges tend to draw the two frame sections together.

Although the above-described methods for joining frame sections together without nails eliminate some of the complexities typically encountered with the nailing method, other problems can result depending upon the size, shape, and material of the frame sections. Specifically, when plastic inserts are provided to hold the two frame sections together, the manufacturing tolerances must be sufficiently controlled to provide an adequate interference fit between the frame sections and the plastic insert. A loose joint can result if close tolerances are not maintained. Further, different size holes and inserts may have to be provided with different thickness frames to ensure a properly formed joint.

Although the use of metal, blade-like members for holding frame sections together simplifies the frame assembling process substantially, there is a significant danger that the ends of the frame sections will be split by the blade-like member as it is driven into the frame. This is a problem if the blade-like members are provided in only one size. When used on relatively small frames, the danger of the frame sections splitting is greatly increased. The problem is even more acute with certain types of wood, such as oak.

On the other hand, if a number of different sizes of the blade-like members are provided, the problem is not necessarily eliminated. The assembler of the frame must be able to properly select the appropriate size blade-like member for the particular frame section shape and size. The blade-like member that is selected must be small enough to avoid splitting the wood but must be large enough to provide a sufficiently tight joint. The frame assembler is thus forced to make choices that may turn out to be incorrect with the result that the frame sections will be damaged.

In view of the problems presently encountered in assembling wood picture frames according to the conventional methods described above, it would be desirable to provide and improved picture frame structure and method for assembling the structure.

Such an improved picture frame structure should preferably also permit the cutting of frame sections to shorter lengths without interfering with the mechanism and method for securing the frame sections together at the corner of the frame.

Such an improved frame structure should also have a greatly reduced splitting susceptibility as a result of joining the frame sections together at the frame corners.

The improved frame structure should also permit the formation of strong, tight joints at the frame corners with a simple, yet effective method that preferably cannot be improperly executed by the frame assembler.

Finally, it would be desirable to provide such an improved frame structure in a configuration that could be manufactured at a relatively low cost.

SUMMARY OF THE INVENTION

Components for constructing a picture frame are provided. The components necessarily form a corner construction at each corner in an assembled picture frame. In a preferred embodiment, a plurality of frame sections are typically engaged in an end-to-end relationship to enclose a predetermined area to form the frame with a forwardly facing front and a rearwardly facing back. In this preferred embodiment, the frame sections have matching mitered ends at each corner of the frame.

Each frame section contains at least a region of material that is deformable under the imposition of a localized force. Each frame section has an end portion at each end defining a rearwardly opening channel. In the preferred embodiment, the channel extends forwardly into the depth of the frame section from the rear of the frame and communicates with a similar channel in the adjoining frame section.

Each frame section also defines a cavity which, in the preferred embodiment, is open to the rear of the frame at the region of deformable material and which communicates with the channel. Each frame section further defines a deformable bearing surface comprising the deformable material adjacent the cavity.

A bracket having two legs is provided for being disposed at an angle substantially identical to the angle formed by the two adjoining frame sections at the frame corner. Initially, the bracket legs are aligned in registry with the channels of the two adjoining frame sections and the bracket is then inserted into the channels so that the bracket becomes disposed within the channels.

Each bracket leg has an engaging member for being received in one of the frame section cavities. The engaging member defines an engaging wall for engaging the frame section bearing surface. The frame section bearing surface and the bracket engaging wall are oriented at angles relative to the length of the frame section whereby, when relative movement is effected between the bracket legs and the frame sections during insertion of the bracket into the channels, the engaging wall of each bracket leg deforms the associated frame section deformable bearing surface and forces the two frame sections together at the corner.

In the preferred embodiment, each bracket has a top margin and a bottom margin with the bottom margin disposed in the channels forwardly of the top margin. The engaging wall defines an engaging face engaged with the frame section bearing surface. The engaging face faces away from the end of the bracket leg and is inclined at an angle along the height of the bracket from the bracket top to the bracket bottom so as to dispose the engaging face closer to the frame corner with increasing distance from the bracket bottom.

Numerous other advantages and features of the present invention will become readily apparent from the following detailed description of the invention and embodiments thereof, from the claims, and from the accompanying drawings.

BRIEF DESCRIPTION OF THE DRAWINGS

In the accompanying drawings forming part of the specifications, and in which like numerals are employed to designate like parts throughout the same, FIG. 1 is a fragmentary, exploded, perspective view of the corner of the picture frame components of the present invention;

FIG. 2 is an enlarged, side elevation view of the bracket taken generally along the plane 2—2 in FIG. 1;

FIG. 3 is an enlarged, fragmentary, top plan view from the rear of the picture frame showing two adjoining frame sections forming the corner of the frame with the bracket cooperating with the frame sections to form a tight, rigid corner; and FIG. 4 is a greatly enlarged, fragmentary, cross-sectional view taken generally along the plane 4—4 in FIG. 4.

DESCRIPTION OF THE PREFERRED EMBODIMENT

While this invention is susceptible embodiment in many different forms, there are shown in the drawings and will herein be described in detail preferred embodiments of the invention. It will be understood, however, that the present disclosure is to be considered as an exemplification of the principles of the invention and is not intended to limit the invention to the embodiment illustrated.

The precise shapes and sizes of the components herein illustrated are not essential to the invention unless otherwise indicated.

FIG. 1 illustrates components for forming a portion of a picture frame. The components are illustrated as being adapted to form one of the four corners of a typical square or rectangular picture frame. It is to be realized, however, that the components of the present invention may be provided to form a picture frame having a non-rectangular shape, such as a triangular shape or some other shape.

The frame includes frame sections 22 and a bracket 60. In a typical four corner square or rectangular frame, four frame sections 22 would be provided to be engaged in an end-to-end relationship to enclose a predetermined area to form the frame with a forwardly facing front (facing downwardly in FIG. 1) and a rearwardly facing back (facing upwardly in FIG. 1). The frame sections 22 each have mitered ends or faces 24 at each corner of the frame. At each corner, a bracket 60 is provided for holding the adjoining frame sections together in a manner described in detail hereinafter.

Typically, the frame sections 22 in a frame have identical cross-sections. The frame sections 22 may be fabricated from wood or some other deformable material. However, each frame section 22 may consist of a composite of different materials. If desired, a substantial portion of each frame section 22 could be fabricated from metal or some other substantially non-deformable material and a relatively deformable material could be used for only a small portion or region of the frame section as will be described in detail hereinafter.

As best illustrated in FIG. 1, each frame section has an exterior side surface 28, an exterior front surface 30, a rear surface 32, and an inwardly extending shoulder 34 which is oriented so that it is generally parallel with the plane of the frame (and with the plane of a picture when a picture is mounted in the frame). A sheet of material, such as a pane of glass, picture, mat, or backing board, or an assembly of one or more such materials, may be placed through the open back of the assembled frame against the inner surface of each frame section shoulder 34.

Each frame section 22 is provided with a novel construction to accommodate the bracket 60. Specifically, each frame section 22 has at least an end portion 40 at each end defining a rearwardly opening channel 42 extending forwardly into the depth of the frame section from the rear of the frame. The channel 42 in each frame section communicates with a similar channel in the adjoining frame section. Each frame section 22 further defines a cavity 50 that is open to the rear of the frame and that communicates with the channel 42. If desired, the channel 42 may extend beyond the cavity 50 in the direction away from the miter face 24. If desired, the channel 42 may extend along the entire length of the frame section from one mitered face to the other mitered face.

In the embodiment illustrated, the cavity 50 is defined generally by a bore which has been drilled normal to the plane of the assembled frame. Owing to the fact that the channel 42 extends in either direction from the cavity 50 and owing to the fact that the channel 42 communicates with the cavity 50, the cavity 50 is defined, in part, by two separated, partially cylindrical surfaces 52 and 54 (FIG. 3).

In the embodiment illustrated, each frame section 22 is fabricated from a suitable wood that is locally deformable under the imposition of a localized force. Each entire frame section 22 may consist of a generally homogeneous, deformable material. However, if desired, each frame section may be fabricated from two or more different materials so long as a generally deformable material is located in each end portion 40 of the frame section 22. In the embodiment illustrated, such a separate, deformable material could be located only in the region around and defining the partially cylindrical surface 54 of the cavity 50.

The deformable material serves a function that will become apparent hereinafter. In any case, the cavity 50 is located so that at least a portion of the cavity wall (e.g., a part or all of surface 54) also defines a deformable bearing surface comprising the deformable material.

The bracket 60 is a generally rigid member with two legs 62 which are disposed at an angle substantially identical to the angle formed by the two adjoining frame sections 22 at the frame corner. The bracket 60 is adapted to be disposed within the channels 42 of the two frame sections 22 when the two frame sections are oriented to form the corner of the assembled frame.

The bracket 60 can be regarded as having a top margin 72 and a bottom margin 74. In use, the bracket 60 is disposed within the frame section channels 42 so that the bottom margin 74 is located forwardly (relative to the front of the assembled frame) of the top margin 72.

Each bracket leg 62 has an engaging member 76 for being received in one of the frame section cavities 50. In the embodiment illustrated, the engaging member 76 is defined by a reversely bent end segment of the bracket leg 62. The engaging member 76 defines an engaging wall 78 (FIGS. 2 and 4) for engaging the frame section bearing surface (e.g., surface 54).

The engaging wall 78 and the frame section bearing surface (e.g., a portion of the surface 54) are oriented at angles relative to the length of the frame section 22. Specifically, the surface 54 is oriented about a longitudinal axis normal to the frame section length while the engaging wall 78 is illustrated in FIG. 2 as being inclined at an angle along the height of the bracket 60 from the bracket top 72 to the bracket bottom 74. The engaging wall 78 faces generally away from the end of the bracket.

Although the engaging wall 78 may be smooth, preferably it defines a toothed face with teeth 80. Thus, when the bracket 60 is fully inserted in the frame section channels 42, the insertion depth of the teeth 80 adjacent the bracket bottom 74 is greater than the insertion depth of the teeth 80 adjacent the bracket top 72. Further, the engaging face teeth 80 adjacent the bracket top 72 are closer to the frame corner than are the engaging face teeth 80 adjacent the bracket bottom 74. In other words, the engaging face is disposed closer to the frame corner with increasing distance from the bracket bottom.

To assemble the frame, the frame sections are oriented at the appropriate angle to form each corner of the frame. Then, the bracket 60 is positioned to align the bracket legs 62 in registry with the channels 42 in two of the adjoining frame sections 22. Relative movement is then effected between the bracket 60 and the frame sections 22 to dispose the bracket 60 within the channels 42 and to cause the engaging wall 78 to deform the associated frame section bearing surface (i.e., to deform the contacted portion of the cylindrical surface 54 in the cavity 50). This forces the two frame sections together in tight engagement at the corner. Typically, the bracket 60 is disposed within the frame sections at each corner by pounding the bracket 60 a few times with a hammer until the bracket top margin 72 of each leg 62 is even with the rear surface 32 of the surrounding frame section 22.

As best illustrated in FIG. 4, the length of the engaging member 76 at the bracket bottom margin 74 is less than the width of the cavity 50 but, owing to the slanted wall 78, the length of the engaging member 76 at the bracket top margin 72 is greater than the width of the cavity 50. Accordingly, the bracket 60 will drop a short distance down into the channel 42 and cavity 50 when the bracket 60 is initially aligned with the frame section channels 42 and before it is driven with a hammer. If the bracket 60 were accidentally oriented upside down (with the bracket top margin 72 facing downwardly toward the frame sections 22), then the longer portion of the engaging member 76 would prevent the bracket from initially dropping into the channels 42 and cavities 50. In this way, it would be clear to the person assembling the frame that the bracket 60 was upside down and should be inverted.

The bracket leg slanted engaging wall 78 and the frame section cavity 50 provide certain other advantages. Specifically, this design accommodates manufacturing tolerances or variations. For example, the shorter length of the bracket leg engaging member 76 at the bracket bottom 74 and the slanted engaging wall 78 function to permit a variation in the manufactured length of the bracket leg 62 and/or location of the cavity 50. A small variance of the bracket leg length or cavity location in either direction along the length of the frame section will not present a problem because the bottom of the bracket leg engaging member 76 is short enough to be received in the cavity 50 with peripheral clearance around the member 76 at the bracket bottom 74. This clearance will permit the initial disposition of the bracket bottom 74 in the frame sections 22 even if the fabricated lengths of the bracket legs 62 are somewhat longer or shorter than designed or even if the cavities 50 are drilled somewhat closer to or further from the frame section ends than originally intended.

The provision of the channels 42 in the frame sections 22 provides substantial advantages in conjunction with the bracket 60. Specifically, if the thickness of each bracket leg 62 is almost as great as the width of each channel 42, then the bracket 60 serves to properly orient the two frame sections 22 at the frame corner. This aligns the mitered faces 24 of each frame section 22 in proper registry and tends to prevent twisting of each frame section about its longitudinal axis relative to the other frame section. Further, since the mitered faces 24 are held in tight alignment in the resulting corner joint, the rigid bracket 60 functions to prevent distortion of the frame sections 22 out of the plane of the assembled frame.

Owing to the fact that the channels 42 and cavities 50 are preformed in the frame sections 22, full insertion of the bracket 60 into the frame sections involves substantially no piercing or penetration of the frame section material over most of the length and surface area of the bracket 60. The penetration or deformation of the frame section material occurs only in a relatively small, localized region where the engaging wall 78 is forced against the frame section bearing surface 54. Thus, there is little possibility that the frame section 22 will split along the length of the bracket 60. In addition, since the localized deformation region of each frame section 22 is so small, and since the deformation forces are directed generally along the length of the frame section and away from the lateral sides of the frame section, the likelihood of splitting the frame section at the deformation region adjacent the bracket engaging wall 78 is virtually nonexistent.

As best seen in FIG. 4, the bracket engaging wall 78 in the illustrated embodiment is angled or inclined relative to the length of the frame section 22 whereas the corresponding contacted bearing surface of the cavity (the contacted portion of the surface 54) is generally vertically oriented and perpendicular to the length of the frame section 22. It is to be realized, however, that the cavity 50 may be inclined and that the bracket engaging wall 78 may be generally normal to the length of the frame section (and to the length of the bracket leg). In such a case, the cavity 50 would slant downwardly from left to right as viewed in FIG. 4. Alternatively, both the bracket engaging wall 78 and the cavity 50 may be angled such that the lower portions of the bracket and cavity are each further from the associated frame section end that the upper portions of the bracket and cavity.

From the foregoing, it will be observed that numerous variations and modifications may be effected without departing from the true spirit and scope of the novel concept of the invention. It is to be understood that no limitation with respect to the specific structures and methods illustrated herein is intended or should be inferred. It is, of course, intended to cover by the appended claims all such modifications as fall within the scope of the claims.

What is claimed is:

1. Components for constructing a picture frame, said components comprising:

a plurality of frame sections for being assembled into a picture frame in which two of said frame sections are adapted to be oriented at an angle to form a corner of the assembled frame at the adjacent ends of the two sections, each said frame section having an end portion at each end containing material that is deformable under the imposition of a localized force, each said frame section end portion defining a channel opening rearwardly when the frame section is assembled with the other frame sections to form the frame, said channel extending from the end of said frame section along said frame section end portion, each said frame section end portion further defining a cavity communicating with said channel and an adjacent deformable bearing surface comprising said deformable material; and a bracket adapted to be disposed within the channels of said two frame sections when oriented to form a corner of the assembled frame, said bracket having two legs disposed at an angle substantially identical to the angle formed by said two frame sections at said frame corner, each said bracket leg having a first portion adapted to be received in one of said frame section channels, each said bracket leg having a second portion with an engaging member for being received in one of said frame section cavities, said engaging member defining an engaging wall to engage said frame section deformable bearing surface, said frame section bearing surface and said bracket engaging wall being oriented at angles relative to the length of the frame section whereby, when the bracket legs are aligned in registry with the channels of said two frame sections disposed to form the corner of the assembled frame, relative movement between the bracket and the frame sections can be effected to dispose the bracket within the channels and to cause the engaging wall of each bracket leg to deform the associated frame section bearing surface and force the two frame sections together at the corner.

2. The components in accordance with claim 1 in which said frame section cavity is defined by a bore normal to the plane of the assembled frame.

3. The components in accordance with claim 1 in which said frame section deformable bearing surface is defined by a partially cylindrical surface.

4. The components in accordance with claim 1 in which each said bracket leg engaging member is defined by a reversely bent end segment of said bracket leg and in which said engaging wall has a face with teeth, said face being inclined at an angle along the height of the bracket from the bracket top to the bracket bottom, said face facing generally away from the end of the bracket whereby, when said bracket is disposed within said frame section channels, the insertion depth of the teeth adjacent the bracket bottom is greater than the insertion depth of the teeth adjacent the bracket top while the teeth adjacent the bracket top are closer to said frame corner than are the teeth adjacent the bracket bottom.

5. A corner construction in an assembled picture frame wherein frame sections are engaged end-to-end to enclose a predetermined area to form the frame with a forwardly facing front and a rearwardly facing back and wherein said frame sections have matching mitered ends at each corner of the frame, said construction comprising:

each said frame section containing at least a region of material that is deformable under the imposition of a localized force, each said frame section having an end portion at each end defining a rearwardly opening channel entending forwardly into the depth of the frame section from the rear of the frame and communicating with a similar channel in the adjoining frame section, each said frame section defining a cavity that is open to the rear of the frame at said region of deformable material and that communicates with said channel, each said frame section further defining a deformable bearing surface comprising said deformable material adjacent said cavity; and a bracket having two legs disposed at an angle substantially identical to the angle formed by said two adjoining frame sections at said frame corner, said bracket being disposed within the channels of the two adjoining frame sections at the corner of the assembled frame, said bracket having a top margin and a bottom margin with said bracket bottom margin disposed in said channels forwardly of said bracket top margin, each said bracket leg having an engaging member received in one of said frame section cavities, said engaging member having an engaging wall defining a toothed engaging face that is engaged with said frame section deformable bearing surface, said toothed engaging face facing away from the end of the bracket leg and being inclined at an angle along the height of the bracket from the bracket top to the bracket bottom so as to dispose said engaging face closer to said frame corner with increasing distance from said bracket bottom whereby the two frame sections are forced together at the corner.

6. A corner bracket for a corner construction in an assembled picture frame wherein frame sections are engaged end-to-end to enclose a predetermined area to form the frame with a forwardly facing front and a rearwardly facing back, wherein said frame sections have matching mitered ends at each corner of the frame, wherein each said frame section contains at least a region of material that is deformable under the imposition of a localized force, wherein each said frame section has an end portion at each end defining a rearwardly opening channel extending forwardly into the depth of the frame section from the rear of the frame and communicating with a similar channel in the adjoining frame section, wherein each said frame section defines a cavity that is open to the rear of the frame at said region of deformable material and that is in communication with said channel, and wherein each said frame section further defines a deformable bearing surface comprising said deformable material adjacent said cavity, said bracket comprising:

a generally rigid member having two legs disposed at an angle substantially identical to the angle formed by said two adjoining frame sections at said frame corner, said bracket having a top margin and a bottom margin, said bracket being adapted to be disposed within the channels of the two adjoining frame sections at the corner of the assembled frame with said bracket bottom margin disposed in said channels forwardly of said bracket top margin, each said bracket leg having an engaging member for being received in one of said frame section cavities, each said engaging member having an engaging wall defining a toothed engaging face facing away from the end of the bracket leg and which is adapted to engage said frame section deformable bearing surface, said toothed engaging face being inclined at an angle along the height of the bracket from the bracket top to the bracket bottom whereby, when said bracket is disposed within said frame section channels, said engaging face is closer to said frame corner with increasing distance from said bracket bottom to force the two frame sections together at the corner.

* * * * *